(12) United States Patent
Nakaya

(10) Patent No.: US 10,207,946 B2
(45) Date of Patent: Feb. 19, 2019

(54) OPTICAL ELEMENT MOLDING MOLD SET AND OPTICAL ELEMENT MANUFACTURING METHOD

(71) Applicant: OLYMPUS CORPORATION, Hachioji-shi, Tokyo (JP)

(72) Inventor: Norio Nakaya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 149 days.

(21) Appl. No.: 15/267,058

(22) Filed: Sep. 15, 2016

(65) Prior Publication Data

US 2017/0001896 A1  Jan. 5, 2017

Related U.S. Application Data

(63) Continuation of application No. PCT/JP2015/056101, filed on Mar. 2, 2015.

(30) Foreign Application Priority Data

Apr. 4, 2014  (JP) .................................. 2014-077419

(51) Int. Cl.
*C03B 11/08*  (2006.01)

(52) U.S. Cl.
CPC ............ *C03B 11/086* (2013.01); *C03B 11/08* (2013.01); *C03B 2215/03* (2013.01); *C03B 2215/24* (2013.01); *C03B 2215/49* (2013.01); *C03B 2215/66* (2013.01); *C03B 2215/72* (2013.01); *C03B 2215/86* (2013.01)

(58) Field of Classification Search
CPC ................... B29L 2011/00–2011/0091; C03B 11/06–11/088
See application file for complete search history.

(56) References Cited

U.S. PATENT DOCUMENTS 3,971,841 A * 7/1976 Rubinstein ............ B29C 43/021
249/59
5,805,361 A * 9/1998 Morimoto ............ G02B 5/1857
359/819

(Continued)

FOREIGN PATENT DOCUMENTS

JP  62128932 A  6/1987
JP  05245865 A  9/1993

(Continued)

OTHER PUBLICATIONS

International Search Report (ISR) and Written Opinion dated May 26, 2015 issued in International Application No. PCT/JP2015/056101.

(Continued)

*Primary Examiner* — Jodi C Franklin
(74) *Attorney, Agent, or Firm* — Holtz, Holtz & Volek PC

(57) ABSTRACT

An optical element molding mold set includes a first mold and a second mold that are opposite to each other, and a third mold that is located on an outer periphery of a cavity between the first mold and the second mold, and an inner peripheral surface of the third mold has different friction coefficients between one side and another side in an opposite direction of the first mold and the second mold.

18 Claims, 5 Drawing Sheets

(56) References Cited

U.S. PATENT DOCUMENTS

| | | | | |
|---|---|---|---|---|
| 6,119,485 | A * | 9/2000 | Hibino | C03B 11/086 249/116 |
| 6,156,243 | A * | 12/2000 | Kosuga | B29C 33/3842 216/11 |
| 2004/0244422 | A1 * | 12/2004 | Yoneda | C03B 11/08 65/29.18 |
| 2004/0253337 | A1 * | 12/2004 | Hashimoto | B29C 37/005 425/354 |
| 2005/0140034 | A1 * | 6/2005 | Ishikawa | B29C 33/56 264/1.33 |
| 2006/0073626 | A1 * | 4/2006 | Shimizu | C03B 11/082 438/48 |
| 2006/0258548 | A1 * | 11/2006 | Gouko | B29C 33/60 508/421 |
| 2007/0002470 | A1 * | 1/2007 | Domschke | A61B 5/14532 359/819 |
| 2009/0324764 | A1 * | 12/2009 | Sekihara | B29C 45/1744 425/161 |
| 2009/0324912 | A1 * | 12/2009 | Hasegawa | B28B 3/021 428/218 |
| 2011/0089586 | A1 * | 4/2011 | Biel | B29C 37/005 264/1.1 |
| 2013/0316194 | A1 * | 11/2013 | Isono | G11B 5/8404 428/846.9 |
| 2014/0217627 | A1 * | 8/2014 | Nakagawa | C03B 7/14 264/2.7 |
| 2016/0004030 | A1 * | 1/2016 | Shiramizu | G02B 7/08 359/826 |

FOREIGN PATENT DOCUMENTS

| | | |
|---|---|---|
| JP | 3131584 B2 | 2/2001 |
| JP | 2006045038 A | 2/2006 |
| JP | 2006137617 A | 6/2006 |
| JP | 2009227532 A | 10/2009 |

OTHER PUBLICATIONS

Chinese Office Action dated Februrary 23, 2018 issued in counterpart Chinese Application No. 201580017601.6.

Japanese Office Action dated May 15, 2018 (and English language translation thereof) issued in counterpart Japanese Application No. 2016-511474.

* cited by examiner

OPTICAL ELEMENT MOLDING MOLD SET AND OPTICAL ELEMENT MANUFACTURING METHOD

CROSS REFERENCE TO RELATED APPLICATIONS

This is a Continuation application of PCT application No. PCT/JP2015/056101, filed Mar. 2, 2015, which was not published under PCT Article 21(2) in English.

This application is based upon and claims the benefit of priority from the prior Japanese Patent Application No. 2014-077419, filed Apr. 4, 2014, the entire contents of which are incorporated herein by reference.

BACKGROUND OF THE INVENTION

Field of the Invention

The present invention relates to an optical element molding mold set for molding an optical element, and an optical element manufacturing method for manufacturing the optical element.

Description of the Related Art

Conventionally, when an optical surface and an outer peripheral surface are simultaneously molded by using an upper mold, a lower mold, and an outer peripheral mold such that a lens that does not need to be centered is molded, there is usually a difference in volume between a space between a molding surface of the upper mold and an upper surface of a glass material and a space between a molding surface of the lower mold and a lower surface of the glass material. Therefore, in a cavity that is a space surrounded by the upper mold, the lower mold, and the outer peripheral mold, a difference is generated between the time needed to fill an outer peripheral portion of the molding surface of the upper mold with glass and the time needed to fill an outer peripheral portion of the molding surface of the lower mold with glass.

Due to the difference in time above, when the outer peripheral portions of the molding surface of the upper mold and the molding surface of the lower mold are attempted to be filled with glass, glass flows from an outer peripheral portion of a molding surface of a mold that has been filled earlier into a gap between the mold that has been filled earlier and the outer peripheral mold.

Accordingly, a method has been proposed for performing molding by using upper and lower molds having a difference in temperature such that transformation of a surface on one side of a molding material is delayed (see, for example, Japanese Laid-Open Patent Publication No. 62-128932).

SUMMARY OF THE INVENTION

According to an aspect, an optical element molding mold set includes a first mold and a second mold that are opposite to each other, and a third mold that is located on an outer periphery of a cavity between the first mold and the second mold, and an inner peripheral surface of the third mold has different friction coefficients between one side and another side in an opposite direction of the first mold and the second mold.

According to another aspect, an optical element manufacturing method includes: heating, pressing, and cooling down a molding material by using an optical element molding mold set, the optical element molding mold set including a first mold and a second mold opposite to each other so as to sandwich the molding material, and a third mold that is located on an outer periphery of a cavity between the first mold and the second mold; and molding an outer peripheral surface of an optical element by using the third mold that has different friction coefficients between one side and another side in an opposite direction of the first mold and the second mold such that speeds are adjusted at which the molding material that has been pressurized in the cavity flows toward one end and another end of an outer periphery of the cavity in the opposite direction.

DETAILED DESCRIPTION OF INVENTION

When a difference in temperature is excessively generated between an upper mold and a lower mold, problems such as deterioration of surface accuracy, fusion-bonding of a molding material such as glass to a mold, or an increase in press time occur. In particular, in a case in which a difference in the volume of a space from the molding material is significant between a side of the upper mold and a side of the molding material, such as a case in which an optical element such as a lens having a meniscus shape is molded from a spherical molding material, it is difficult to set a temperature condition having productivity.

As described above, when a molding material flows into a gap between an upper mold or a lower mold and an outer peripheral mold due to a difference in volume between a space between a molding surface of the upper mold and an upper surface of the molding material and the space between a molding surface of the lower mold and a lower surface of the molding material, burrs are generated around a molded optical element. In order to remove the burrs, chamfering needs to be performed, for example.

An optical element molding mold set and an optical element manufacturing method according to embodiments of the present invention are described below with reference to the drawings.

Figure 1:
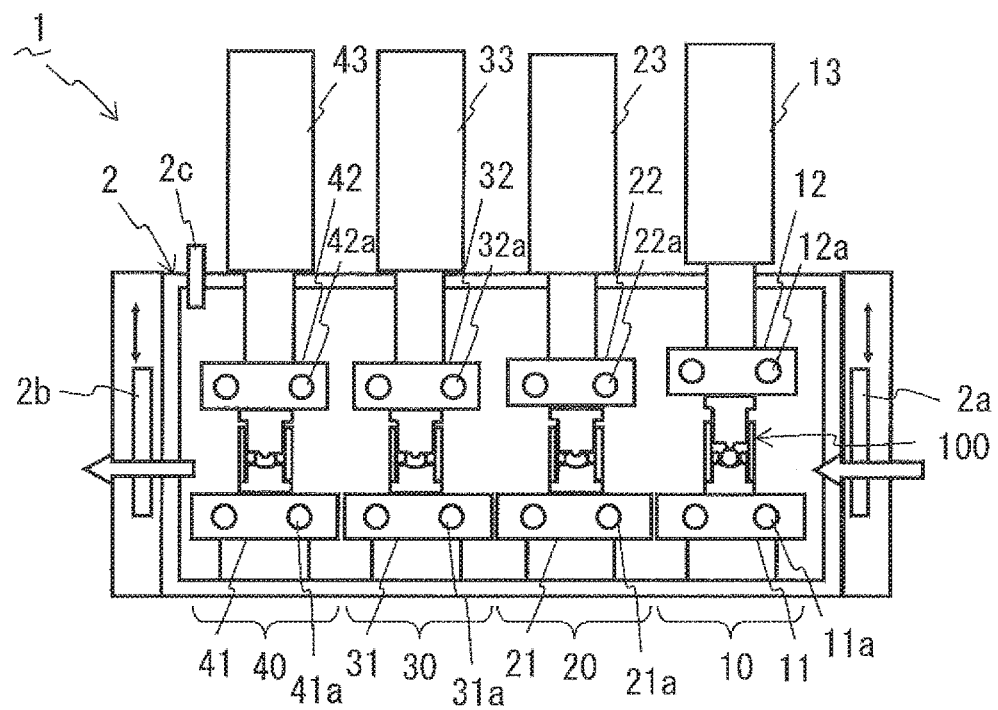
FIG. 1 is a sectional view illustrating an optical element molding apparatus according to an embodiment of the present invention.

FIG. 1 is a sectional view illustrating an optical element molding apparatus 1 according to an embodiment of the present invention.

The optical element molding apparatus 1 illustrated in FIG. 1 includes a molding chamber 2, a preliminary heating stage 10, a first press stage 20, a second press stage 30, and a cooling stage 40.

The molding chamber 2 includes an insertion-side shutter 2a, an ejection-side shutter 2b, and an inflow port 2c.

The insertion-side shutter 2a is controlled by a control unit (not illustrated) so as to be opened when an optical element molding mold set (hereinafter simply referred to as a "mold set") 100 is inserted into the molding chamber 2. The ejection-side shutter 2b is controlled by the control unit (not illustrated) so as to be opened when the mold set 100 is ejected from the inside of the molding chamber 2. The control unit (not illustrated) controls operations of various units of the optical element molding apparatus 1. Insertion and ejection of the mold set 100, and conveyance of the mold set 100 among stages 10, 20, 30, and 40 described below, are performed by an arm (not illustrated).

The inflow port 2c is a port from which inert gas such as nitrogen flows, and the inside of the molding chamber 2 is configured so as to be able to be replaced with a gas that flows from the inflow port 2c.

The preliminary heating stage 10, the first press stage 20, the second press stage 30, and the cooling stage 40 respectively include pairs of a lower press plate 11, 21, 31, or 41 and an upper press plate 12, 22, 32, or 42 and pressurization drive units 13, 23, 33, and 43.

The lower press plate 11, 21, 31, or 41 and the upper press plate 12, 22, 32, or 42 are arranged opposite to each other so as to sandwich the mold set 100. Cartridge heaters 11a, 21a, 31a, 41a, 12a, 22a, 32a, and 42a that are examples of a heating source are respectively incorporated into the lower press plates 11, 21, 31, and 41 and the upper press plates 12, 22, 32, and 42, and the lower press plates 11, 21, 31, and 41 and the upper press plates 12, 22, 32, and 42 can be set as an arbitrary temperature.

The lower press plates 11, 21, 31, and 41 are fixed, for example, to a base in the molding chamber 2. The upper press plates 12, 22, 32, and 42 are coupled to the pressurization drive units 13, 23, 33, and 43 that are, for example, air cylinders that vertically drive the upper press plates 12, 22, 32, and 42. The upper press plates 12, 22, 32, and 42 perform operations, such as clipping or clamping of the mold set 100, by being lifted or lowered by the pressurization drive units 13, 23, 33, and 43.

Figures 2A, 2B:
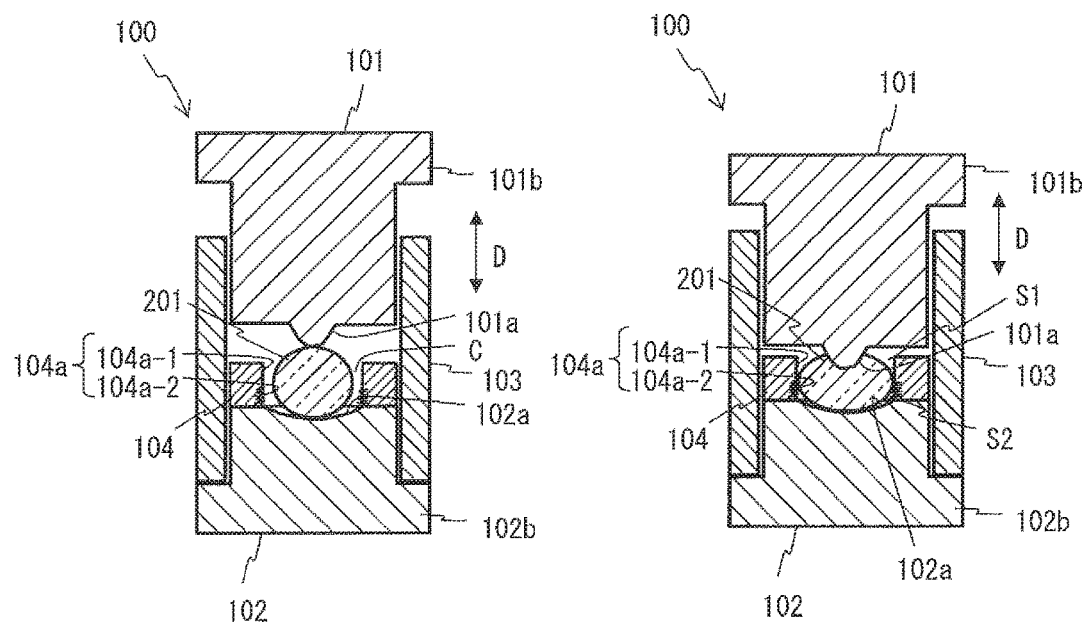
FIGS. 2A and 2B are sectional views illustrating an optical element molding mold set according to an embodiment of the present invention.

As illustrated in FIGS. 2A and 2B, the mold set 100 includes an upper mold 101, a lower mold 102, a drum mold 103, and an outer peripheral mold 104.

The upper mold 101 and the lower mold 102 are examples of a first mold and a second mold that are opposite to each other. The outer peripheral mold 104 is an example of a third mold that is located on an outer periphery of a cavity C between the upper mold 101 and the lower mold 102.

The upper mold 101 and the lower mold 102 have, for example, a columnar shape.

A molding surface 101a having, for example, a convex shape that is used to mold an optical function surface of an optical element is formed on a bottom surface of the upper mold 101. A molding surface 102a having, for example, a concave shape that is used to mold an optical function surface of an optical element is formed on an upper surface of the lower mold 102. Portions surrounding a projection and a recess that are located in the center of the molding surfaces 101a and 102a of the upper mold 101 and the lower mold 102 are, for example, flat surfaces.

A flange 101b is formed at an upper end of the upper mold 101. In addition, a flange 102b is formed at a lower end of the lower mold 102.

The drum mold 103 has, for example, a cylindrical shape. The upper mold 101 is inserted into the drum mold 103 from an upper end, and the lower mold 102 is inserted into the drum mold 103 from a lower end. The drum mold 103 is located between the flange 101b of the upper mold 101 and the flange 102b of the lower mold 102 around the upper mold 101 and the lower mold 102. The upper mold 101 is configured in such away that an outer peripheral surface can slide with respect to an inner peripheral surface of the drum mold 103.

The outer peripheral mold 104 has, for example, a cylindrical shape, and is located on an outer periphery of the cavity C between the upper mold 101 and the lower mold 102. The outer peripheral mold 104 is arranged between the upper mold 101 and the lower mold 102 inside the drum mold 103. The outer peripheral mold 104 is located, for example, between the flat surfaces of the molding surfaces 101a and 102a of the upper mold 101 and the lower mold 102.

Figure 3:
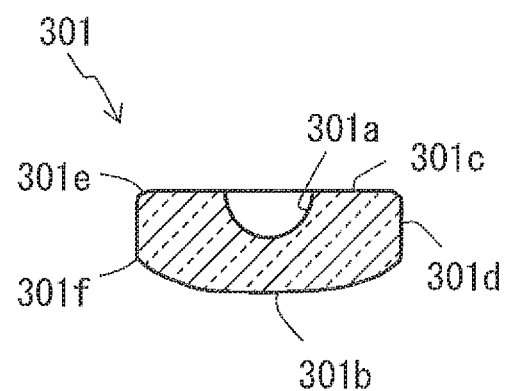
FIG. 3 is a sectional view illustrating an optical element manufactured according to an optical element manufacturing method according to an embodiment of the present invention.

An inner peripheral surface of the outer peripheral mold 104 is a molding surface 104a that is used to mold a cylindrical surface of a side surface of an optical element (namely, an edge 301d illustrated in FIG. 3).

The molding surface 104a of the outer peripheral mold 104 includes a mirror surface 104a-1 that is located on a side of a first mold 101 in a direction in which the upper mold 101 and the lower mold 102 are opposite to each other (arrow D), and a rough surface 104a-2 that is located on a side of the lower mold 102. It is preferable that a boundary position between the mirror surface 104a-1 and the rough surface 104a-2 be near a position in which a molding material 201 having, for example, a spherical shape is pressed so as to be transformed, and first comes into contact with the outer peripheral mold 104.

The molding material 201 arranged between the upper mold 101 and the lower mold 102 first comes into contact with the molding surface 104a of the outer peripheral mold 104 illustrated in FIGS. 2A and 2B in an intermediate portion between the upper mold 101 and the lower mold 102, and the molding material 201 then moves vertically along the molding surface 104a. At this time, the molding material 201 moves along the molding surface 104a at a higher drift velocity on a side of the mirror surface 104a-1 having a small friction coefficient than on a side of the rough surface 104a-2 having a large friction coefficient.

The mirror surface 104a-1 is formed by performing grinding, and has, for example, an arithmetic average roughness of 40 nm. The rough surface 104a-2 is formed by performing electrical discharge machining, and has, for example, an arithmetic average roughness of 300 nm. As described above, the molding surface 104a of the outer peripheral mold 104 has a surface roughness that is different between one side and the other side in an opposite direction (arrow D). Accordingly, the molding surface 104a of the outer peripheral mold 104 has a friction coefficient that is different between one side and the other side in the opposite direction (arrow D).

It is preferable that an arithmetic average roughness Ra of the mirror surface 104a-1 be, for example, smaller than or equal to 50 nm and that an arithmetic average roughness Ra of the rough surface 104a-2 be, for example, greater than or equal to 200 nm. Note that the names "mirror surface 104a-1" and "rough surface 104a-2" are examples.

It is preferable that the mold set 100 be finished by performing precision processing on hard metal such as tungsten carbide (WC). It is also preferable that an optical material such as commercially available optical glass be used for the molding material 201.

An optical element manufacturing method for heating, pressing, and cooling down the molding material 201 by using the mold set 100 so as to manufacture an optical element 301 is described below.

An example is described in which the optical element 301 illustrated in FIG. 3 is manufactured by using a spherical abrasive article having a diameter of 2.36 mm as the molding material 201. A concave optical function surface 301a on one side of the optical element 301 has a concave surface having a radius of curvature of 1.266 mm and a spherical segment diameter of 2.12 mm, and a flat surface 301c that is located in a peripheral portion continuous with the concave surface. A convex optical function surface 301b on the other side of the optical element 301 has a convex surface having a radius of curvature of 10.9 mm.

The optical element 301 is a concave meniscus lens having an outer diameter (a diameter) of 3.3 mm and a center thickness of 0.38 mm, and in the optical element 301, the concave optical function surface 301a, the convex optical function surface 301b, the flat surface 301c, and an edge 301d are simultaneously molded. An upper ridge line portion 301e is located at an upper edge of the edge 301d, and a lower ridge line portion 301f is located at a lower end of the edge 301d.

As illustrated in FIG. 1, the mold set 100 is first inserted into the molding chamber 2 in a state in which the insertion-side shutter 2a is opened. The mold set 100 is conveyed between the lower press plates 11 and the upper press plate 12 in the preliminary heating stage 10 that has been heated at a prescribed temperature that is lower than a glass transition point. The pressurization drive unit 13 in the preliminary heating stage 10 lowers the upper press plate 12, and the mold set 100 and the molding material 201 are heated in a state in which the upper press plate 12 abuts onto the upper mold 101 illustrated in FIGS. 2A and 2B of the mold set 100.

After a prescribed time period (for example, 60 seconds) has passed, the mold set 100 is conveyed between the lower press plate 21 and the upper press plate 22 in the first press stage 20 that has been heated at a prescribed temperature that is higher than a glass yield point. The pressurization drive unit 23 in the first press stage 20 lowers the upper press plate 22, and the mold set 100 and the molding material 201 are heated in a state in which the upper press plate 22 abuts onto the upper mold 101 of the mold set 100.

After a prescribed time period (for example, 30 seconds) has passed, a main press process is started by increasing a descent pressure of the upper press plate 22 in the first press stage 20. As illustrated in FIG. 2B, the molding material 201 during pressing is expanded from the central portions to the outer peripheries of the molding surfaces 101a and 102a of the upper mold 101 and the lower mold 102, and the concave optical function surface 301a, the convex optical function surface 301b, and the flat surface 301c illustrated in FIG. 3 are formed. Then, in the molding material 201, the edge 301d is molded by the outer peripheral mold 104, and finally, the upper ridge line portion 301e and the lower ridge line portion 301f are filled with the molding material 201.

The molding surface 104a of the outer peripheral mold 104 is formed so as to include the mirror surface 104a-1 in an upper portion from a position in which the molding material 201 first comes into contact with the molding surface 104a and to include the rough surface 104a-2 in a lower portion, and therefore a flow resistance caused when the molding material 201 is transformed along the molding surface 104a becomes larger in the lower portion. Stated another way, the lower portion has a lower speed at which a not-yet-filled space is filled with the molding material 201 than the upper portion. Consequently, a final filling time is almost the same between the upper portion, which has a large not-yet-filled space, and the lower portion, which has a small not-yet-filled space.

As described above, speeds at which the molding material 201 that has been pressurized in the cavity C flows toward one end and the other end of an outer periphery of the cavity C in the opposite direction (arrow D) are adjusted, and the molding material 201 is prevented from reaching one of both of the ends of the outer periphery of the cavity C earlier. Considering the generation of burrs or an increase in press time due to overfilling of the molding material 201, it is preferable that a not-yet-filled portion (a free surface) of, for example, about R0.05 mm be formed by not completely filling the cavity C with the molding material 201.

After pressing of the molding material 201 has been completed in the first press stage 20, the mold set 100 is conveyed between the lower press plate 31 and the upper press plate 32 in the second press stage 30 that has been heated at a prescribed temperature around a transition point of the glass material. The pressurization drive unit 33 in the second press stage 30 lowers the upper press plate 32 such that the mold set 100 is slowly cooled down during a prescribed time period while being pressurized.

Then, the mold set 100 is conveyed between the lower press plate 41 and the upper press plate 42 in the cooling stage 40. The pressurization drive unit 43 in the cooling stage 40 lowers the upper press plate 42, and the mold set 100 is held and cooled down during a prescribed time period in a state in which the upper press plate 42 abuts onto the upper mold 101 of the mold set 100. The mold set 100 is conveyed to the outside of the molding chamber 2 with the ejection-side shutter 2b open.

In the optical element 301 manufactured as described above, the concave optical function surface 301a, the convex optical function surface 301b, the flat surface 301c, and the edge 301d are formed, as illustrated in FIG. 3, and not-yet-transferred portions (free surfaces) of the upper ridge line portion 301e and the lower ridge line portion 301f are uniform so as to be, for example, R0.05 mm.

An example of a condition whereby a friction coefficient is differentiated on the molding surface 104a of the outer peripheral mold 104 is described.

As illustrated in FIG. 2B, in a space surrounded by the outer peripheral mold 104, a space S1 on a side of the upper mold 101 and a space S2 on a side of the lower mold 102 are considered that sandwich the molding material 201 at a point in time at which the molding material 201 is pressurized so as to reach the inner peripheral surface 104a of the outer peripheral mold 104. It is preferable that the friction coefficient of the molding surface 104a of the outer peripheral mold 104 become smaller in a space having a larger volume (for example, S1) than in a space having a smaller volume (for example, S2) from among the spaces S1 and S2 above.

Figure 4:
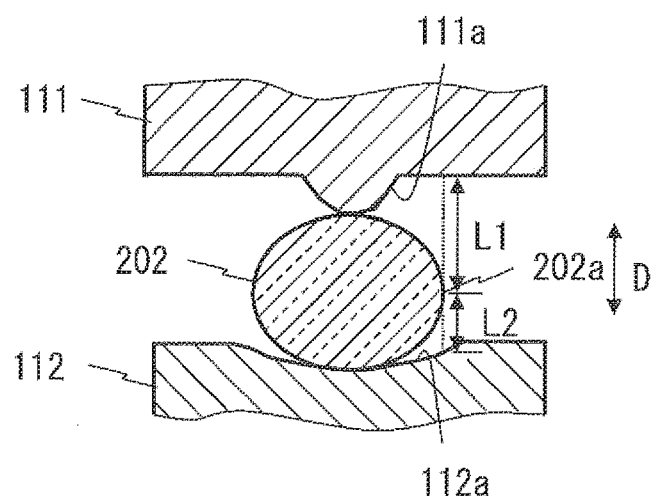
FIG. 4 is a diagram (no. 1) explaining lengths between an outer peripheral portion of a molding material and molds according to an embodiment of the present invention.

FIG. 4 is a diagram (no. 1) explaining a length L1 between an outer peripheral portion 202a of a molding material 202 and an upper mold 111 and a length L2 between the outer peripheral portion 202a and a lower mold 112.

As illustrated in FIG. 4, the upper mold 111 includes a molding surface 111a having a convex shape, and the lower mold 112 includes a molding surface 112a having a concave shape. The molding material 202 has, for example, an oval spherical shape or a spherical shape.

A length L1 between the outer peripheral portion 202a of the molding material 202 and the upper mold 111 in a direction (arrow D) in which the upper mold 111 and the lower mold 112 are opposite to each other is longer than a length L2 between the outer peripheral portion 202a and the lower mold 112 in the opposite direction (arrow D).

From this point of view, in order to increase a flow velocity on a side of an upper portion of the molding surface 104a of the outer peripheral mold 104, which is a longer one of the lengths L1 and L2, it is preferable that the mirror surface 104a-1 having a small friction coefficient be formed on the side of the upper portion, and that the rough surface 104a-2 having a large friction coefficient be formed on a side of a lower portion of the molding surface 104a, similarly to FIGS. 2A and 2B. When the magnitude of the friction coefficient is set according to a comparison of the lengths L1 and L2, the volumes of the spaces S1 and S2 illustrated in FIG. 2B do not need to be calculated, and the magnitude of the friction coefficient can be set easily.

Figure 5:
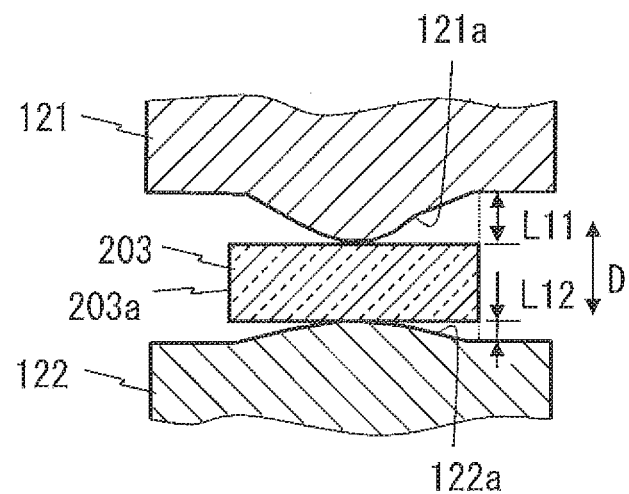
FIG. 5 is a diagram (no. 2) explaining lengths between an outer peripheral portion of a molding material and molds according to an embodiment of the present invention.

FIG. 5 is a diagram (no. 2) explaining a length L11 between an outer peripheral portion 203a of a molding material 203 and an upper mold 121 and a length L12 between the outer peripheral portion 203a and a lower mold 122.

As illustrated in FIG. 5, the upper mold 121 includes a molding surface 121a having a convex shape, and the lower mold 122 includes a molding surface 122a having a convex shape. The molding material 203 has, for example, a disk shape.

A length L11 between the outer peripheral portion 203a of the molding material 203 and the upper mold 121 in a direction (arrow D) in which the upper mold 121 and the lower mold 122 are opposite to each other is longer than a length L12 between the outer peripheral portion 203a and the lower mold 122 in the opposite direction (arrow D).

From this point of view, in order to increase a flow velocity on a side of an upper portion of the molding surface 104a of the outer peripheral mold 104, which is a longer one of the lengths L1 and L2, it is preferable that the mirror surface 104a-1 having a small friction coefficient be formed on the side of the upper portion, and that the rough surface 104a-2 having a large friction coefficient be formed on a side of a lower portion of the molding surface 104a, similarly to FIGS. 2A and 2B.

In order to differentiate the friction coefficient between one side and the other side of the molding surface 104a of the outer peripheral mold 104 illustrated in FIGS. 2A and 2B in the direction (arrow D) in which the upper mold 101 and the lower mold 102 are opposite to each other, the mirror surface 104a-1 and the rough surface 104a-2 do not always need to be formed in such a way that surface roughness is different between one side and the other side. As an example, coating may be applied, for example, on a side on which a friction coefficient is desired to be reduced of the molding surface 104a of the outer peripheral mold 104. Examples of coating include diamond-like carbon.

Further, in order to differentiate a friction coefficient between both one side and the other side of the molding surface 104a of the outer peripheral mold 104 illustrated in FIGS. 2A and 2B in the direction (arrow D) in which the upper mold 101 and the lower mold 102 are opposite to each other, the friction coefficient does not always need to be different between one end and the other end in the opposite direction (arrow D). As an example, portions respectively having large and small friction coefficients may be formed in a portion of the molding surface 104a of the outer peripheral mold 104. Alternatively, the molding surface 104a of the outer peripheral mold 104 may gradually increase or decrease the friction coefficient toward a side of the upper mold 101 or a side of the lower mold 102.

In the embodiments, the outer peripheral mold 104 has been described as an example of the third mold that is located on an outer periphery of the cavity C between the upper mold 101 and the lower mold 102 (examples of the first mold and the second mold that are opposite to each other). However, in a mold set 100 in which the outer peripheral mold 104 is not arranged, when an inner peripheral surface of the drum mold 103 functions as a molding surface (the outer periphery of the cavity C), the drum mold 103 can be used as the third mold. A mold in which the drum mold 103 and the outer peripheral mold 104 have been integrated may be used as the third mold.

In the embodiments, the mold set 100 that is conveyed within the optical element molding apparatus 1 has been described as an optical element molding mold set. However, in an optical element molding apparatus 1 to which the upper mold 101 and the lower mold 102 are fixed and that includes, for example, only one stage, the upper mold 101, the lower mold 102, and the outer peripheral mold 104 can be considered to be an optical element molding mold set.

In the embodiments described above, the mold set 100 includes the upper mold 101 and the lower mold 102, which are examples of the first mold and the second mold that are opposite to each other, and the outer peripheral mold 104, which is an example of the third mold that is located on an outer periphery of the cavity C between the upper mold 101 and the lower mold 102. The molding surface 104a, which is an inner peripheral surface of the outer peripheral mold 104, has different friction coefficients between one side and the other side in a direction (arrow D) in which the upper mold 101 and the lower mold 102 are opposite to each other.

Therefore, speeds at which the molding material 201 that has been pressurized in the cavity C flows toward one end and the other end of the outer periphery of the cavity C in the direction (arrow D) in which the upper mold 101 and the lower mold 102 are opposite to each other can be adjusted. Thus, according to the embodiments, the molding material 201 is suppressed from flowing into spaces between the upper mold 101 and the lower mold 102 opposite to each other and the outer peripheral mold 104 that is located on the outer periphery of the cavity C between the upper mold 101 and the lower mold 102. Consequently, burrs can be suppressed from being generated in the optical element 301, and therefore chamfering for removing the burrs is omitted, and the optical element 301 can be manufactured at a low cost.

In addition, according to the embodiments, the molding surface 104a of the outer peripheral mold 104 has different friction coefficients between one side and the other side in the direction (arrow D) in which the upper mold 101 and the lower mold 102 are opposite to each other due to differing surface roughness. Accordingly, by using a simple method for differentiating surface roughness on the molding surface 104a of the outer peripheral mold 104, the molding material 201 is suppressed from flowing into a space between the upper mold 101 or the lower mold 102 and the outer peripheral mold 104.

According to the embodiments, it is preferable that the molding surface 104a of the outer peripheral mold 104 include a portion in which an arithmetic average roughness Ra is smaller than or equal to 50 nm (the mirror surface 104a-1) and a portion in which the arithmetic average roughness Ra is greater than or equal to 200 nm (the rough surface 104a-1). In this case, a difference in a flow velocity of the molding material 201 is likely to become larger, and the molding material 201 is further suppressed from flowing into the space between the upper mold 101 or the lower mold 102 and the outer peripheral mold 104.

According to the embodiments, in a case in which a coating has been applied on the molding surface 104a of the outer peripheral mold 104, the molding material 201 is suppressed from flowing into the space between the upper mold 101 or the lower mold 102 and the outer peripheral mold 104 with no need to perform grinding or electrical discharge machining on the outer peripheral mold 104.

According to the embodiments, in a case in which the coating above is diamond-like carbon, a difference in a flow velocity of the molding material 201 is likely to become larger, and the molding material 201 is further suppressed from flowing into the space between the upper mold 101 or the lower mold 102 and the outer peripheral mold 104.

According to the embodiments, the molding material 201 is pressurized so as to reach the molding surface 104*a* of the outer peripheral mold 104 in a space surrounded by the outer peripheral mold 104, as illustrated in FIG. 2B. A friction coefficient of the molding surface 104*a* of the outer peripheral mold 104 is smaller in a space having a larger volume than in a space having a smaller volume from among the space S1 on a side of the upper mold 101 and the space S2 on a side of the lower mold 102 that sandwich the molding material 201 at a point in time at which the molding material 201 reaches the molding surface 104*a*. Accordingly, a flow velocity of the molding material 201 can increase on a side of a mold (the upper mold 101) having a larger not-yet-filled space in the cavity C, by easily setting the magnitude of a friction coefficient.

According to the embodiments, the molding surface 104*a* of the outer peripheral mold 104 illustrated in FIGS. 2A and 2B has a smaller friction coefficient on aside of the upper mold 101, which is one mold of the upper mold 101 and the lower mold 102, than on a side of the lower mold 102, which is the other mold of the upper mold 101 and the lower mold 102. The one mold is the upper mold 111 or 121 (L1 or L11) having a longer length in the opposite direction (arrow D) from the outer peripheral portion 202*a* or 203*a* of the molding material 202 or 203 before being pressurized than the lower mold 112 or 122 (L2 or L12), as illustrated in FIGS. 4 and 5. Accordingly, the volumes of the spaces S1 and S2 do not need to be calculated, as described above, and the flow velocity of the molding material 201 can increase on a side of a mold (the upper mold 101) having a larger not-yet-filled space in the cavity C, by easily setting the magnitude of the friction coefficient.

The invention claimed is:

1. An optical element molding mold set comprising:
a first mold and a second mold that are opposite to each other along a first direction; and
a third mold that is located on an outer periphery of a cavity between the first mold and the second mold,
wherein the third mold comprises a molding surface at an inner peripheral surface of the third mold, the molding surface being positioned to mold an entire outer peripheral surface of an optical element, and
wherein the molding surface has a first side and a second side along the first direction, and the first side and the second side of the molding surface have different friction coefficients.

2. The optical element molding mold set according to claim 1, wherein the first side and the second side of the molding surface of the third mold have the different friction coefficients due to a difference in surface roughness between the first side and the second side.

3. The optical element molding mold set according to claim 2, wherein the molding surface of the third mold comprises a first surface portion at the first side and a second surface portion at the second side, and
wherein one of the first surface portion and the second surface portion has an arithmetic average roughness Ra that is less than or equal to 50 nm, and the other of the first surface portion and the second surface portion has an arithmetic average roughness Ra that is greater than or equal to 200 nm.

4. The optical element molding mold set according to claim 1, wherein the molding surface of the third mold comprises a coating, and
wherein the first side and the second side of the molding surface of the third mold have the different friction coefficients due to the coating.

5. The optical element molding mold set according to claim 4, wherein the coating is diamond-like carbon.

6. The optical element molding mold set according to claim 1, wherein the first mold and the second mold are configured to sandwich and pressurize a molding material in a space surrounded by the third mold, to cause the molding material to move toward and reach the molding surface of the third mold,
wherein the first mold and the second mold are configured such that at a point in time at which the molding material is pressurized so as to reach the molding surface of the third mold, a first space on a side of the first mold has a different volume than a second space on a side of the second mold, and
wherein the friction coefficient of the molding surface of the third mold is smaller on a side of one of the first and second spaces that has a larger volume than on a side of the other of the first and second spaces that has a smaller volume.

7. The optical element molding mold set according to claim 1, wherein the first mold and the second mold are configured to sandwich and pressurize a molding material in the cavity between the first mold and the second mold,
wherein the first mold and the second mold are configured such that, before the molding material is pressurized, a distance along the first direction between the first mold and an outer peripheral portion of the molding material is different from a distance along the first direction between the second mold and the outer peripheral portion of the molding material,
wherein the friction coefficient of the molding surface of the third mold is smaller on a side of one of the first and second molds having a longer distance in the first direction from the outer peripheral portion of the molding material before the molding material is pressurized.

8. The optical element molding mold set according to claim 1, wherein the third mold is positioned between the first mold and the second mold.

9. The optical element molding set according to claim 1, wherein the friction coefficient of the molding surface of the third mold increases or decreases gradually between the first side and the second side of the molding surface.

10. An optical element manufacturing method comprising:
forming an optical element by heating, pressing, and cooling down a molding material in an optical element molding mold set to form an optical element, the optical element molding mold set including a first mold and a second mold opposite to each other along a first direction so as to sandwich the molding material, and a third mold that is located on an outer periphery of a cavity between the first mold and the second mold;
wherein the forming the optical element comprises:
pressurizing the molding material in the cavity between the first and second molds; and
molding an entire outer peripheral surface of the optical element using the third mold, the third mold including an inner peripheral surface that includes a molding surface, and the molding surface being positioned to mold the entire outer peripheral surface of the optical element, wherein the molding surface has a first side and a second side along the first direction, and the first side and the second side of the molding surface have different friction coefficients such that the molding material, which has been pressurized in the cavity, flows at different speeds toward a first end and a second end of an outer periphery of the cavity in the first direction.

11. The optical element manufacturing method according to claim 10, wherein the first side and the second side of the molding surface of the third mold have the different friction coefficients due to a difference in surface roughness between the first side and the second side.

12. The optical element manufacturing method according to claim 11, wherein the molding surface of the third mold comprises a first surface portion at the first side and a second surface portion at the second side, and wherein one of the first surface portion and the second surface portion has an arithmetic average roughness Ra that is less than or equal to 50 nm, and the other of the first surface portion and the second surface portion has an arithmetic average roughness Ra that is greater than or equal to 200 nm.

13. The optical element manufacturing method according to claim 10, wherein the molding surface of the third mold comprises a coating, and wherein the first side and the second side of the molding surface of the third mold have the different friction coefficients due to the coating.

14. The optical element manufacturing method according to claim 13, wherein the coating is diamond-like carbon.

15. The optical element manufacturing method according to claim 10, wherein pressurizing the molding material in the cavity comprises sandwiching and pressurizing the molding material by the first and second molds in a space surrounded by the third mold, to cause the molding material to move toward and reach the molding surface of the third mold, wherein the first mold and the second mold are configured such that at a point in time at which the molding material is pressurized so as to reach the molding surface of the third mold, a first space on a side of the first mold has a different volume than a second space on a side of the second mold, and wherein the friction coefficient of the molding surface of the third mold is smaller on a side of one of the first and second spaces that has a larger volume than on a side of the other of the first and second spaces that has a smaller volume.

16. The optical element manufacturing method according to claim 10, wherein the first mold and the second mold are configured such that, before the molding material is pressurized, a distance along the first direction between the first mold and an outer peripheral portion of the molding material is different from a distance along the first direction between the second mold and the outer peripheral portion of the molding material, wherein the friction coefficient of the molding surface of the third mold is smaller on a side of one of the first and second molds having a longer distance in the first direction from the outer peripheral portion of the molding material before the molding material is pressurized.

17. The optical element manufacturing method according to claim 10, wherein the third mold is positioned between the first mold and the second mold.

18. The optical element manufacturing method according to claim 10, wherein the friction coefficient of the molding surface of the third mold increases or decreases gradually between the first side and the second side of the molding surface.

* * * * *